United States Patent
Han et al.

(10) Patent No.: US 10,128,676 B2
(45) Date of Patent: Nov. 13, 2018

(54) METHOD AND APPARATUS FOR CHARGING A BATTERY

(71) Applicant: Samsung Electronics Co., Ltd., Samsung-ro, Yeongtong-gu, Suwon-si, Gyeonggi-do (KR)

(72) Inventors: Ki-Wook Han, Gyeonggi-do (KR); Jin-Su Kim, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 464 days.

(21) Appl. No.: 14/475,055

(22) Filed: Sep. 2, 2014

(65) Prior Publication Data

US 2015/0061575 A1    Mar. 5, 2015

(30) Foreign Application Priority Data

Sep. 3, 2013 (KR) .................. 10-2013-0105549

(51) Int. Cl.
    *H02J 7/00* (2006.01)

(52) U.S. Cl.
    CPC ............ *H02J 7/007* (2013.01); *H02J 7/0052* (2013.01); *H02J 7/0042* (2013.01); *H02J 2007/0062* (2013.01); *H02J 2007/0096* (2013.01)

(58) Field of Classification Search
    USPC .......................................................... 320/107
    See application file for complete search history.

(56) References Cited

U.S. PATENT DOCUMENTS

| | | | |
|---|---|---|---|
| 5,625,275 A | 4/1997 | Tanikawa et al. | |
| 7,528,582 B1 | 5/2009 | Ferguson | |
| 8,284,067 B2 | 10/2012 | Yasuda et al. | |
| 2003/0141850 A1 | 7/2003 | Dotzler et al. | |
| 2006/0181241 A1* | 8/2006 | Veselic | G06F 1/266 320/107 |
| 2007/0222301 A1* | 9/2007 | Fadell | G06F 1/266 320/148 |
| 2009/0184688 A1* | 7/2009 | Kim | G06F 1/26 320/162 |
| 2010/0188238 A1* | 7/2010 | Yasuda | G06F 1/26 320/162 |
| 2013/0180423 A1 | 7/2013 | Rastegar et al. | |
| 2015/0236522 A1 | 8/2015 | Zhao et al. | |

FOREIGN PATENT DOCUMENTS

| | | |
|---|---|---|
| CN | 103208850 A | 7/2013 |
| EP | 1 691 252 A1 | 8/2006 |
| EP | 1 691 252 B1 | 9/2010 |

OTHER PUBLICATIONS

European Search Report dated May 30, 2017.
Chinese Search Report dated Jul. 4, 2017.

* cited by examiner

*Primary Examiner* — Robert Grant
(74) *Attorney, Agent, or Firm* — Cha & Reiter, LLC.

(57) ABSTRACT

An electronic device is provided that includes: a terminal unit including a first terminal and a second terminal; a driver configured to provide one of a first signal and a second signal to the first terminal, the first signal having a first current level and the second signal having a second current level; and a driving controller configured to cause the driver to detect, at the second terminal, a third signal having the same current level as the first signal, and cause the driver to provide the second signal to the first terminal in response to detecting the third signal.

16 Claims, 6 Drawing Sheets

METHOD AND APPARATUS FOR CHARGING A BATTERY

CROSS-REFERENCE TO RELATED APPLICATION

This application claims priority under 35 U.S.C. § 119(a) to Korean Application Serial No. 10-2013-0105549, which was filed in the Korean Intellectual Property Office on Sep. 3, 2013 the entire content of which is hereby incorporated by reference.

TECHNICAL FIELD

The present disclosure relates to electronic devices and more particularly to a method and apparatus for charging a battery.

BACKGROUND

Smartphones and other portable computing devices are subject to ever increasing performance demands. The performance demands placed on smartphones require the provision of high-capacity batteries in order to ensure an adequate power supply. At present, the need exists for the development of new techniques for efficiently and safely charging such batteries.

SUMMARY

The present disclosure addresses this need. According to one aspect of the disclosure, an electronic device is provided comprising: a terminal unit including a first terminal and a second terminal; a driver configured to provide one of a first signal and a second signal to the first terminal, the first signal having a first current level and the second signal having a second current level; and a driving controller configured to detect, at the second terminal, a third signal having substantially the same current level as the first signal, and cause the driver to provide the second signal to the first terminal in response to detecting the third signal.

According to another aspect of the disclosure, an electronic device is provided comprising a terminal unit having a first terminal and a second terminal, and a charging controller configured to: receive a first signal via the first terminal; detect whether the first signal matches one of a first current level threshold and a second current level threshold; output a second signal via the second terminal when the first signal matches the first current level threshold; and route the first signal to a power unit, when the first signal matches the second current level threshold; wherein the power unit comprises a battery.

According to yet another aspect of the disclosure, a method is provided comprising: outputting a first signal via a first terminal of terminal unit, the first signal having a first current level; receiving a second signal via a second terminal of the terminal unit, the second signal having a second current level; detecting whether the first current level matches the second current level; and outputting, via the first terminal, a third signal having a third current level in response to the second current level matching the first current level.

According to yet another aspect of the disclosure, a method is provided comprising: receiving a first signal via a first terminal of a terminal unit; detecting whether the first signal matches one of a first current level threshold and a second current level threshold; outputting a second signal via a second terminal of the terminal unit, the second signal being output when the first signal matches the first current level threshold; and routing the first signal to a power unit, when the first signal matches the second current level threshold; wherein the power unit comprises a battery.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
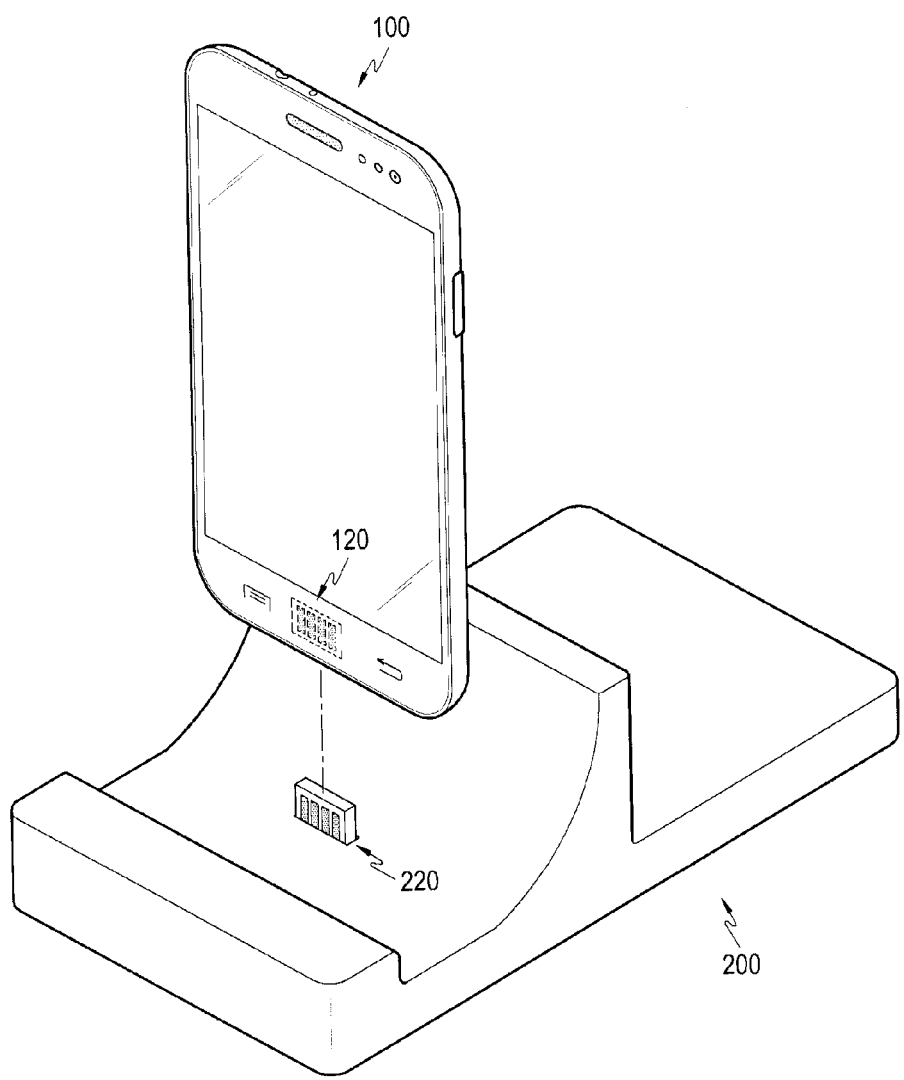
FIG. 1 is a diagram of an example of a charging system according to aspects of the disclosure.

Hereinafter, specific examples of the disclosed subject matter will be described with reference to the accompanying drawings. However, it is to be understood that the present disclosure is not restricted or limited to these examples. It is further to be understood that the same reference numerals represented in each of the drawings indicate elements that perform substantially the same functions.

Terms including ordinal numerals such as "first", "second", and the like can be used to describe various structural elements, but the structural elements are not limited by these terms. The terms are used only to distinguish one structural element from another structural element. The terms used in this application are used only for the purpose of describing particular examples and are not intended to limit the disclosure in any way. As used herein, the use of singular forms of any noun is intended to encompass the plural forms of that noun, unless the context clearly indicates otherwise.

FIG. 1 is a diagram of an example of a charging system according to aspects of the disclosure. As illustrated, the charging system includes a first electronic device 100 and a second electronic device 200. For example, the first electronic device 100 may include a communications terminal (and/or any other suitable type of battery-powered electronic device) and the second electronic device 200 may include a charging device for supplying power to the communications terminal. The device 100 and the device 200 may include electric terminals for receiving and supplying power, respectively. For example, the device 100 may include a terminal unit 120 (e.g., receptacle) and the device 200 may include a terminal unit 220 that is adapted to connect to the terminal unit 120.

Figure 2:
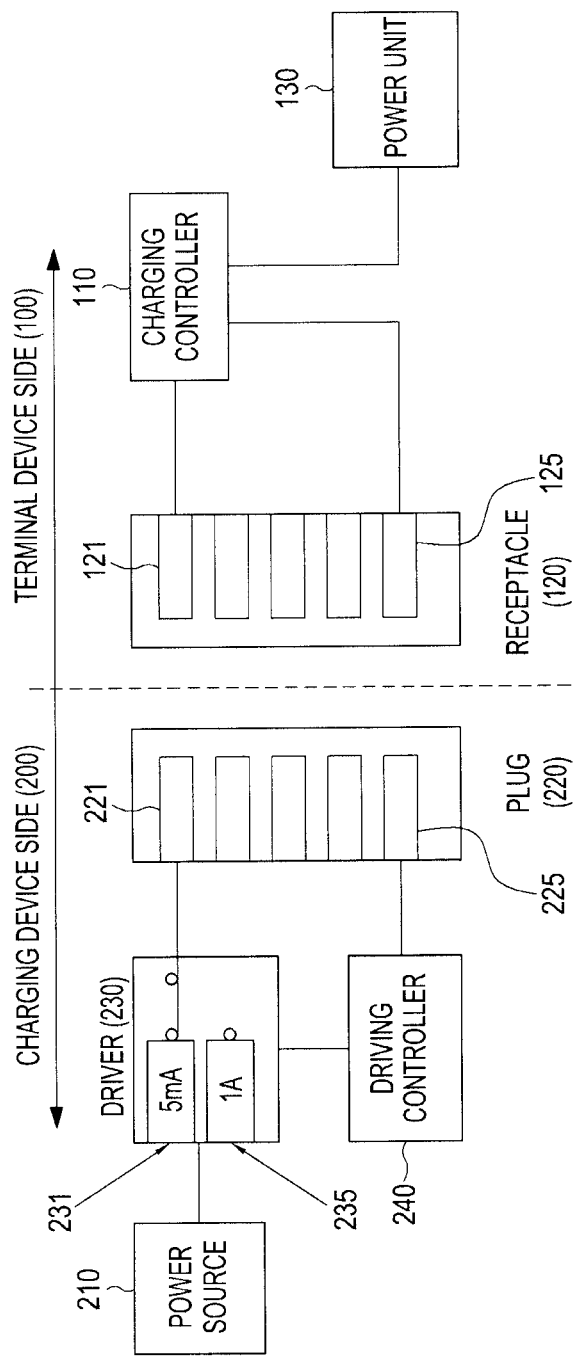
FIG. 2 is a block diagram of an example of the system of FIG. 1 in accordance with aspects of the disclosure.

FIG. 2 is a block diagram of an example of the system of FIG. 1 in accordance with aspects of the disclosure. As illustrated, in this example, the device 100 includes a charging controller 110, the terminal unit 120, and a power unit 130. The device 200 includes a power source 210, the terminal unit 220, a driver 230, and a driving controller 240.

The power source 210 provides power required for the charging of the device 100. For example, the power source 210 may convert power obtained from an electric outlet (for example, AC 220 V, AC 110 V or the like) to power (for example, DC 5V) required for the charging of the device 100. Additionally or alternatively, as another example, the power source 210 may include a component for converting power (for example, DC 12 V, DC 5 V or the like) input from the outside to the power (for example, DC 5V) required for the charging of the device 100. Additionally or alternatively, as another example, the power source 210 may include a power storage device (for example, a secondary battery) which can store the power (for example, DC 5V) required for the charging of the device 100.

The terminal unit 220 may include at least one terminal arranged to connect to the terminal unit 120. The terminal unit 220 may be used to transmit/receive charging power or transmit/receive data. For example, the terminal unit 120 may include a receptacle, and the terminal unit 220 may include a plug arranged to mate with the receptacle.

Furthermore, although in this example the terminal unit 120 and the terminal unit 220 are provided in a receptacle/plug arrangement, it is to be understood that they can be implemented in any other suitable way for as long as the terminal unit 120 and the terminal unit 220 are connectable with each other. For example, the terminal unit 120 and the terminal unit 220 can both be implemented as receptacles (or plugs), and they may be coupled to each other through a cable including plugs (or receptacles) at both ends thereof. In another example, either one of the terminal unit 120 and the terminal unit 220 can be implemented as a receptacle and the other one can be implemented as a plug, so that they can be coupled to each other directly without the use of a cable or another similar device.

In some implementations, the terminal unit 220 may at least include a first terminal 221 (charging terminal) used for supplying charging power and a second terminal 225 (identification terminal) used for identifying a terminal coupled to the terminal unit 220. Furthermore, the terminal unit 220 may include a terminal based on a Universal Serial Bus (USB) interface. For example, the first terminal 221 may include a VBUS terminal used for the USB interface and the second terminal 225 may include an ID terminal. And still furthermore, the terminal unit 220 may further include data transmission/reception terminals (D+ and D−) based on the USB interface and a ground terminal (GND) coupled to a ground end.

The driver 230 provides a path supplying power provided from the power source to the first terminal 221. Particularly, the driver 230 may be configured to restrictively supply power. That is, when the terminal unit 120 (e.g., receptacle) and the terminal unit 120 (e.g., plug) are combined and the power provided from the power source 210 is continuously supplied to the first terminal 221, the terminals included in the terminal unit 220 are electrically coupled to each other, and thus the power may abnormally flow in at least one terminal included in the terminal unit 220 or sparks may be generated. Accordingly, internal components of the charging device 200 may be damaged or at least one terminal included in the terminal unit 220 may be damaged. In order to prevent such damage from occurring, the driver 230 may be configured to restrictively supply power provided from the power source to the first terminal 221. For example, the terminal unit 220 may supply only power of a predetermined first level before a terminal unit of another electronic device is coupled to the terminal unit 220, and supply power of a second level when the terminal unit of another electronic device is coupled to the terminal unit 220. For example, the driver 230 may include a path 231 supplying a current having a first level (e.g., 5 mA) and a path 235 supplying a current having a second level (e.g., 1 A).

In some implementations, the driving controller 240 may be configured to selectively connect the path 231 and the path 235 to the terminal unit 220. For example, the driving controller 240 may cause the path 231 supplying the current of the predetermined first level (e.g., 5 mA) to be coupled to the first terminal 221 before the terminal unit of another electronic device is coupled to the terminal unit 220. After the terminal unit 120 of the device 100 is coupled to the terminal unit 220, the driving controller 240 may receive a signal corresponding to the current of the first level (e.g., 5 mA) through the second terminal 225. In response to the receipt of this signal, the driving controller may cause the path 235 supplying the current of the second level (e.g., 1 A) to become coupled to the first terminal 221.

When the driving controller 240 switches the path 235 to the first terminal 221 in response to the reception of the current of the first level (e.g., 5 mA), electrical problems, such as abnormal current, and sparks, may arise which can cause the device 200 to malfunction. To prevent such malfunctions, in some implementations, the signal fed to the second terminal 225 may be set to have a reduced current level that is less than the first level (e.g., 5 mA). In these implementations, the driving controller 240 may cause the path 235 to become coupled to the first terminal 221 in response to detecting the receipt of a signal having the reduced current level at the second terminal 225.

The terminal unit 120 may include at least one terminal coupled to the terminal unit 220 to transmit/receive charging power or transmit/receive data. For example, the terminal unit 120 may at least include a first terminal 121 (charging terminal) used for receiving charging power and a second terminal 125 (identification terminal) used for transmitting identification information. In some implementations, the terminal unit 120 may include Universal Serial Bus (USB) interface terminal. In such implementations, the first terminal 121 may be a VBUS terminal and the second terminal 125 may be an ID terminal. Further, as it can be readily appreciated, the terminal unit 120 may further include data transmission/reception terminals (D+ and D−) ground terminal (GND).

The charging controller 110 may be coupled to the terminal unit 120. Particularly, the charging controller 110 may be coupled to the first terminal 121 of the terminal unit 220 to receive power provided by the charging device 200. In operation, the charging controller 110 may detect a current value of power provided by the first terminal 121 and take an action based on the detected current value. For example, when it is detected that a signal having a first current level is received at the first terminal 121 (e.g., 5 mA), that signal (or a portion of that signal) may be switched to the second terminal 125. More specifically, in some instances, the charging controller 110 may be configured to route only a part (for example, 10 µA) of the current received via the first terminal 121 to the second terminal 125 (for example, 10 µA).

Furthermore, when it is detected that a signal having a second current level (e.g., 1 A) is received at the first terminal 121, that signal may be routed to the power unit 130 by the charging controller 110. The power unit 130 may include a battery and/or any other suitable component for providing power to the device 100.

Figure 3A:
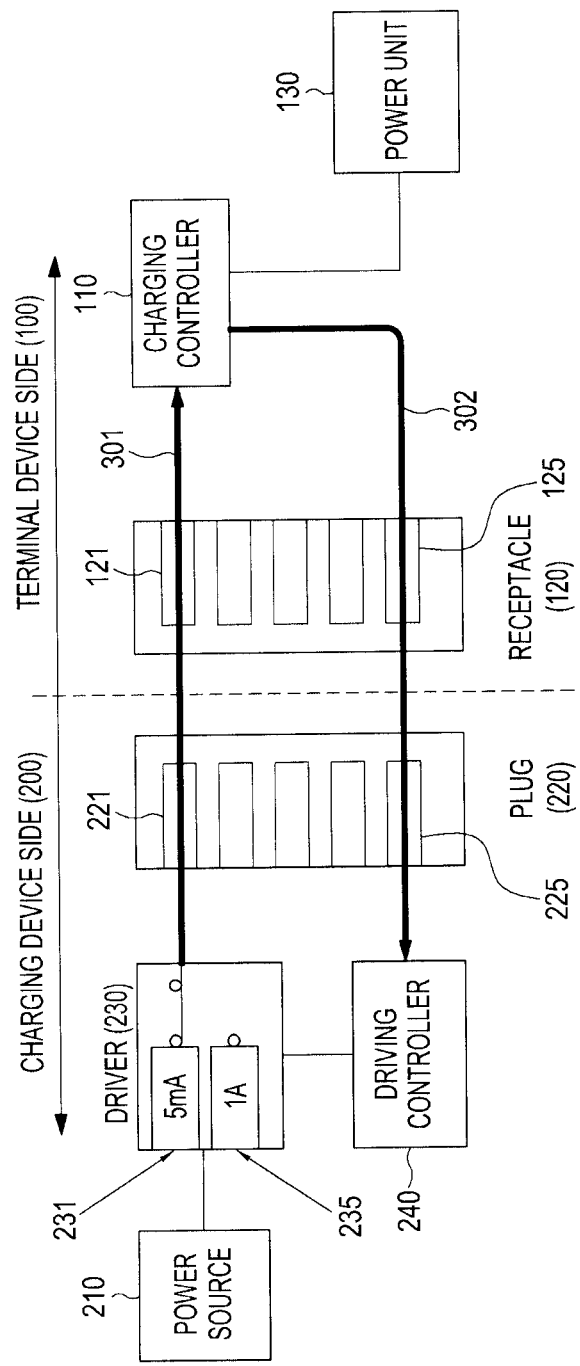
FIG. 3A and FIG. 3B illustrate an example of the operation of the charging system according to aspects of the disclosure.
Figure 3B:
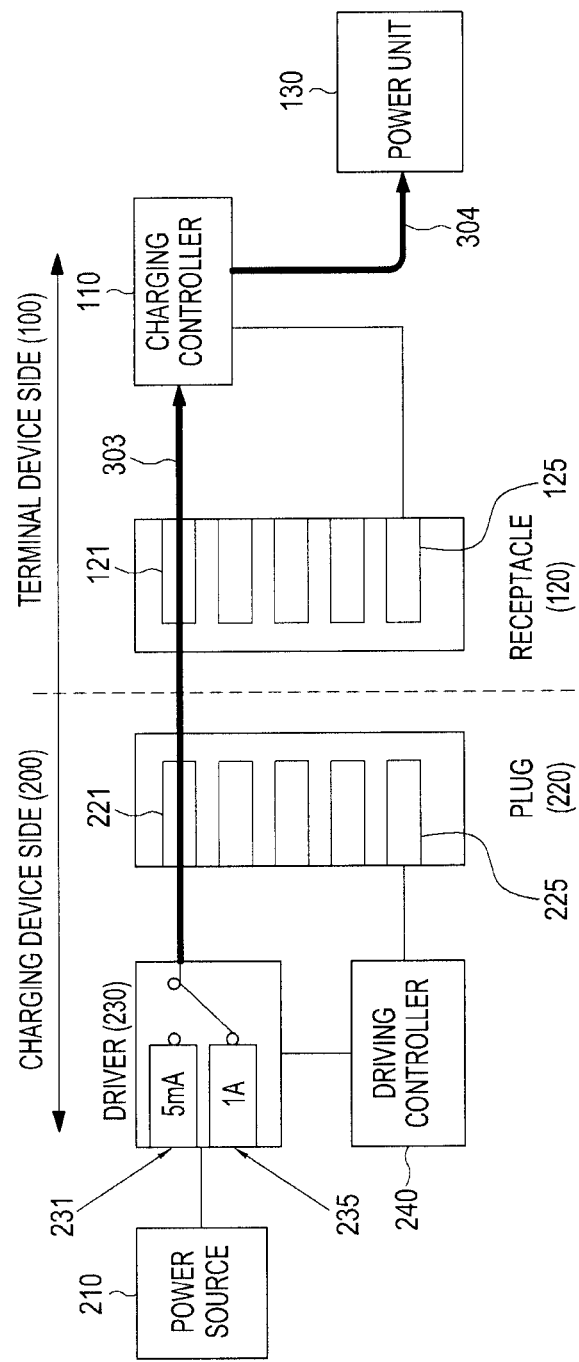

FIGS. 3A and 3B illustrate an example of the operation of the charging system of FIG. 1 according to aspects of the disclosure. In this example, the driving controller 240 controls the driver 230 to connect the path supplying the current of the predetermined first level (e.g., 5 mA) to the first terminal 221 before the terminal unit 120 of the device 100 is coupled to the terminal unit 220.

Thereafter, when the terminal unit 120 of the device 100 is coupled to the terminal unit 220 of the device 200, the first terminal 221 of the terminal unit 220 forms contact with the first terminal 121 of the terminal unit 120. Accordingly, the current of the first level (e.g., 5 mA) provided by the path 231 may be supplied to the charging controller 110 of the device 100 as illustrated by a reference numeral 301.

The charging controller 110 may detect that the current of the first level (e.g., 5 mA) is provided by the first terminal 121 and may output another signal via the terminal 125. In some implementations, the signal may be output by routing a portion of the current received via the first terminal 121 to the second terminal 125 by the charging controller 110. To that end, as noted above, the current signal may have a level that is lower than the first level of the current received via the first terminal (e.g., 5 mA).

Upon receiving a predetermined signal (e.g., a signal that satisfies a threshold) via the terminal 225, the driving controller 240 may cause the driver 230 to connect the path 235 to the first terminal 221. Thereafter, power provided by the path 235 may be supplied to the charging controller 110 through the first terminal 221 of the terminal unit 220 and the first terminal 121 of the terminal unit 120.

When the path 235 is coupled to the terminal 221, the charging controller 110 may detect the current of the second level (e.g. 1 A) and feed that current to the power unit 130 as indicated by a reference numeral 304 in response.

Through the above described configuration and operation, the power provided by the charging device 200 is supplied to the device 100. That is, the charging device 200 may output a current value of the charging power restrictively only when the device 100 is coupled. Accordingly, in a state where the terminals included in the terminal unit 220 are configured to the external environment of the terminal unit 220, it is possible to prevent the damage of the terminal or the charging device 200 due to an abnormal contact of the terminals.

Further, the charging device 200 may prevent oxidation or corrosion of the second terminal 225 by preventing a predetermined current continuously from being output to the second terminal 225 included in the terminal unit 220.

Figure 4:
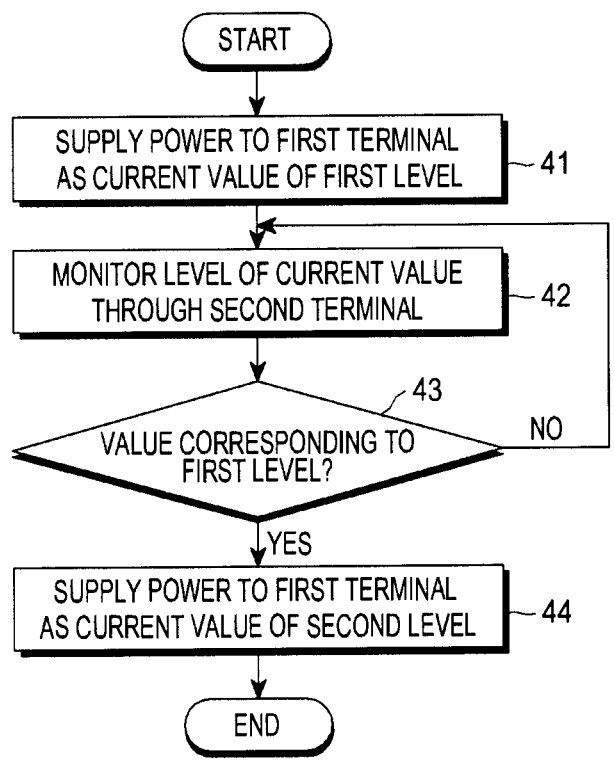
FIG. 4 is a flowchart of an example of a process in accordance with aspects of the disclosure.

FIG. 4 is a flowchart of an example of a process in accordance with aspects of the disclosure. In some implementations, the process may be executed when a charging device is powered on.

In step 41, the charging device may first restrictively output power provided from a power source through a first electric terminal of the charging device. For example, only a part (current of the predetermined first level) of the output current supported by the power source may be supplied to the first terminal by limiting power provided by the power source.

The first terminal may include a terminal used for supplying charging power. The charging device may include a terminal based on the USB interface, and particularly the first terminal may include the VBUS terminal used for the USB interface.

In step 42, the charging device monitors the level of current input through a second electric terminal of the charging device. The charging device detects whether current of the predetermined first level (for example, 5 mA) (or a current (for example, 10 μA) corresponding to the current of the predetermined first level) flows into the second terminal.

Further, the second terminal may include the identification terminal used for identifying the electronic device coupled to the charging device. In addition, as described above, the charging device may include the terminal based on the Universal Serial Bus (USB) interface. The second terminal may include the ID terminal used for the USB interface. Although an embodiment of the present disclosure describes that the second terminal is the ID terminal used for the USB interface, the present disclosure is not limited thereto. For example, it is sufficient that the second terminal can identify whether the current (for example, 5 mA) of the predetermined first level (or a current (for example, 10 μA) corresponding to the current of the predetermined first level) flows from the electronic device coupled to the charging device. For example, it goes without saying that the second terminal may variously change the data transmission/reception terminals (D+and D−) based on the USB interface and apply the changed terminals in consideration of the configuration of the electronic device coupled to the charging device.

When the current of the predetermined first level (for example, 5 mA) (or a current (for example, 10 μA) corresponding to the current of the predetermined first level) flows into the second terminal, the charging device performs step 44.

In step 44, the charging device outputs a charging signal through the first terminal. In some implementations, the current level of the output charging signal may be equal to a maximum current flow rate that is supported by the power source.

Figure 5:
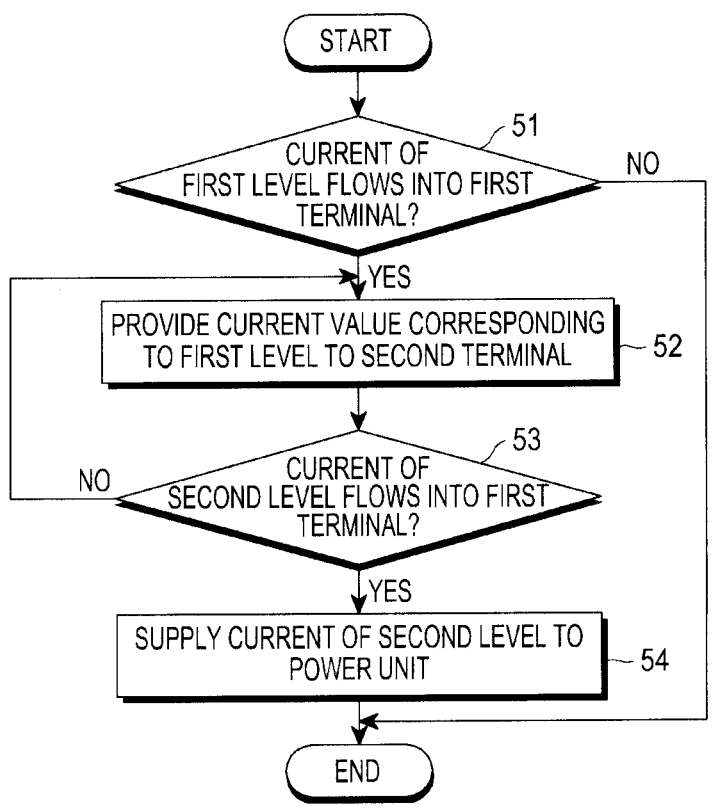
FIG. 5 is a flowchart of an example of another process according to aspects of the disclosure.

FIG. 5 is a flowchart of an example of another process according to aspects of the disclosure. In some implementations, the process may be performed when a electronic device is coupled to a charging device for charging.

First, the electronic device identifies whether current of the predetermined first level (for example, 5 mA) flows in through the first terminal coupled to the charging device in step 51. When the current of the predetermined first level (for example, 5 mA) flows, step 52 is performed. When the current of the predetermined first level (for example, 5 mA) does not flow into the first terminal, the process ends or step 51 can be repeated again.

In step 52, the current of the predetermined first level (for example, 5 mA) (or a current (for example, 10 μA) corresponding to the current of the predetermined first level) may flow into the second terminal to provide the current of the predetermined first level (for example, 5 mA) (or a current (for example, 10 μA) corresponding to the current of the predetermined first level) to the charging device.

Next, the electronic device identifies whether the current of the second level (e.g., 1 A) is supplied through the first terminal. When the current of the second level (e.g., 1 A) is supplied through the first terminal, step 54 is performed. When the current (e.g., 1 A) of the second level is not supplied through the first terminal, the process returns to step 52.

In step 54, the electronic device performs an operation of supplying power received through the first terminal to a power unit of the electronic device.

Although an embodiment of the present disclosure describes that the second terminal is the ID terminal used for the USB interface, the present disclosure is not limited thereto. For example, it is sufficient that the second terminal can supply the current (for example, 5 mA) of the predetermined first level (or a current (for example, 10 μA) corresponding to the current of the predetermined first level) to the charging device. For example, in some implementations, the second terminal may variously change the data transmission/reception terminals (D+ and D−) based on the USB interface and apply the changed terminals.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. A charging device comprising:
   a terminal unit including a first terminal and a second terminal;
   a driver configured to provide a first signal having a first current value or a second signal having a second current value greater than the first current value to an electronic device via the first terminal; and
   a driving controller configured to:
   cause the driver to provide the first signal to the electronic device via the first terminal,
   identify that the electronic device is connected to the charging device in response to detecting a third signal corresponding to the first signal having the first current level from the electronic device, at the second terminal, and
   cause the driver to provide the second signal to the electronic device via the first terminal in response to identifying that the electronic device is connected to the charging device,
   wherein the second signal powers the electronic device.

2. The charging device of claim 1, wherein the terminal unit includes a terminal based on a Universal Serial Bus (USB) interface.

3. An electronic device comprising a terminal unit having a first terminal and a second terminal, and a charging controller configured to:
   detect a first signal having a first current value from a charging device via the first terminal;
   route at least a portion of the first signal back to the charging device via the second terminal to indicate to the charging device that the electronic device is connected to the charging device;
   receive a second signal having a second current value greater than the first current value from the charging device via the first terminal; and
   route the second signal to a power unit of the electronic device.

4. The electronic device of claim 3, wherein the terminal unit includes a terminal based on Universal Serial Bus (USB) interface.

5. A method comprising:
   providing, by a charging device, a first signal having a first current value to an electronic device via a first terminal of a terminal unit;
   identifying that the electronic device is connected to the charging device in response to detecting, by the charging device, at a second terminal, a third signal corresponding to the first signal having the first current level from the electronic device; and
   providing, by the charging device, a second signal having a second current value greater than the first current value to the electronic device via the first terminal in response to identifying that the electronic device is connected to the charging device,
   wherein the second signal powers the electronic device.

6. The method of claim 5, wherein the terminal unit includes a terminal based on a Universal Serial Bus (USB) interface.

7. A method comprising:
   detecting, by an electronic device, a first signal having a first current value from a charging device via a first terminal of a terminal unit in the electronic device;
   routing, by the electronic device, at least a portion of the first signal back to the charging device via a second terminal in the electronic device to indicate the charging device that the electronic device is connected to the charging device;
   receiving, by the electronic device, a second signal having a second current value greater than the first current value from the charging device via the first terminal; and
   routing, by the electronic device, the second signal to a power unit of the electronic device.

8. The method of claim 7, wherein the terminal unit includes a terminal based on Universal Serial Bus (USB) interface.

9. The charging device of claim 1, wherein the first terminal includes a charging terminal that provides charging power to the electronic device.

10. The charging device of claim 1, wherein the second terminal includes an identification terminal that identifies a device coupled to the terminal unit.

11. The electronic device of claim 3, wherein the first terminal includes a charging terminal that receives charging power from the charging device.

12. The electronic device of claim 3, wherein the second terminal includes an identification terminal that identifies the charging device coupled to the terminal unit.

13. The method of claim 5, wherein the first terminal includes a charging terminal that provides charging power to the electronic device.

14. The method of claim 5, wherein the second terminal includes an identification terminal that identifies a device coupled to the terminal unit.

15. The method of claim 7, wherein the first terminal includes a charging terminal that receives charging power from the charging device.

16. The method of claim 7, wherein the second terminal includes an identification terminal that identifies the charging device coupled to the terminal unit.

\* \* \* \* \*